United States Patent [19]

Baer

[11] Patent Number: 4,829,537
[45] Date of Patent: May 9, 1989

[54] SOLID STATE LASERS WITH SPHERICAL RESONATORS

[75] Inventor: Thomas M. Baer, Mountain View, Calif.

[73] Assignee: Spectra-Physics, Inc., San Jose, Calif.

[21] Appl. No.: 936,284

[22] Filed: Dec. 1, 1986

[51] Int. Cl.⁴ .......................... H01S 3/06; H01S 3/16
[52] U.S. Cl. ...................................... 372/66; 372/92; 372/95; 372/99; 372/108; 356/350
[58] Field of Search ...................... 372/66, 108, 92, 95, 372/72, 16, 75, 97, 99, 109, 705, 94; 356/350

[56] References Cited

U.S. PATENT DOCUMENTS

| | | | |
|---|---|---|---|
| 3,440,561 | 4/1969 | Pole et al. | 372/24 |
| 3,538,453 | 11/1970 | Miller | 372/66 |
| 3,967,215 | 6/1976 | Bellak | 372/73 |
| 4,039,260 | 8/1977 | Redman | 356/350 |

*Primary Examiner*—James W. Davie
*Assistant Examiner*—Xuan T. Vo
*Attorney, Agent, or Firm*—Paul Davis

[57] ABSTRACT

A nonstandard spherical resonator which produces laser radiation having spherical modes of oscillation is formed entirely within a sphere of laser gain material. The resonator is pumped to produce the spherical modes. By pumping an isotropically coated sphere at normal incidence the entire sphere forms the resonator, and the laser radiates uniformly in all directions as from a point source. By pumping obliquely to totally internally reflect the laser radiation at the surface of the sphere, or by applying an equatorial coating on the sphere to internally reflect the laser radiation, toroidal region within the sphere forms the resonator. The pumping volume can be controlled so that the laser radiation is single longitudinal mode and single frequency by limiting the active mode volume. Prisms can be used for input and output coupling to the toroidal resonator; and optical fiber can also be used for output coupling. A compact laser design uses a Nd:YAG sphere pumped by a laser diode. The spherical resonators can be used for traking, holography, levelling and ring laser gyroscope applications. The toroidal resonator forms an ideal ring laser for use as a gyroscope; a sphere with three orthongonal toroidal resonators provides three degree of freedom measurement capability.

19 Claims, 6 Drawing Sheets

SOLID STATE LASERS WITH SPHERICAL RESONATORS

BACKGROUND OF THE INVENTION

The invention relates generally to solid state lasers and more particularly to solid state laser resonator configurations which oscillate to spherical modes.

The standard (Schawlow-Townes) laser configuration includes an active medium placed between a pair of spaced mirrors which define a resonant cavity with cylindrical symmetry. The modes of oscillation of this cylindrical resonator have Gaussian intensity profiles and behave essentially as plane waves.

However, the concept of a resonator can be extended to any fully bounded surface in which standing waves are created. Theoretical calculations of spherical modes are described in Stratton, *Electromagnetic Theory*, McGraw Hill, 1941, P. 554. Although no practical laser configuration with a spherical resonator has been demonstrated, a few researchers have performed preliminary experiments that show the existence of spherical modes in a nonstandard resonator configuration.

Garrett et.al., "Stimulated Emission Into Optical Whispering Modes of Spheres," Phys. Rev., V. 124, N. 6, P. 1807, Dec. 15, 1961, shows stimulated emission into optical whispering modes of a spherical sample of Sm-doped $CaF_2$. Spheres of 1–2 mm diameter were placed in a liquid hydrogen Dewar and pumped by flashlamps.

Lin et.al., "Some Characteristics of a Droplet Whispering-Gallery Mode Laser," Opt. Let., V. 11, N. 10, P. 614, Oct. 1986, and Tzeng et.al., "Laser Emission from Individual Droplets at Wavelengths Corresponding to Morphology-Dependent Resonances," Opt. Let., V. 9, N. 11, P. 499, Nov. 1984, observed laser emissions from 40–60 micron liquid dye solution droplets pumped by Q-switched or CW lasers. Multiple frequency outputs are produced. Snow et.al., "Nonlinear Optics with a Micrometer-Size Droplet," Optics News, P. 5, May 1986, describes amplified Raman waves travelling around the circumference of a droplet as well as lasing from droplets.

Some spherical modes may occur even in an conventional cylindrical resonator as undesired parasitic modes. Linn et.al., "Effect of Trapped Light on the Output of a Ruby Laser," App. Opt., V. 4, N. 9, P. 1099, Sept. 1965, describes the near field patterns from a flashlamp pumped ruby rod (in a conventional resonator) due to the action of trapped modes, including modes caused by total internal reflection from the ruby walls; however, these modes are spurious and transitory, and cannot become permanently established. Yajima et.al., "Cylindrical Mode of Oscillators in a Ruby Optical Maser," Symposium on Optical Masers, P. 111, Apr. 1963, modified a parallel-plate resonator by forming a hole in one of the mirrors to suppress the normal high gain modes of oscillation through the center of a ruby rod and produce a helical mode of oscillation in an annular ring of the rod. U.S. Pat. No. 3,440,561 shows a conventional resonator configuration in which the gain medium is a sphere but the resonator is defined by external mirrors; only a cylindrical portion of the sphere is used as the active gain medium as in a conventional rod amplifier with the spherical shape of the gain medium being used as a lens to allow switching between different resonator defining external mirrors.

Thus while some spherical modes of oscillation have been experimentally observed as an optical effect in a material, the prior art does not disclose a practical laser which uses a spherical resonator configuration to generate a useful output in the form of spherical waves. It is necessary and desirable to provide a practical laser design which uses a solid state laser gain medium such as Nd:YAG, which has a simple and efficient pump source such as a laser diode, which defines a spherical resonator cavity, which allows effective matching of the pumping region to the active gain medium of the resonator, which produces an output having useful and controllable characteristics such as single frequency and single longitudinal mode, and which has effective means for output coupling. A laser with these features would produce an output which would be useful in a variety of applications, including tracking, levelling, holography, and ring laser gyroscopes.

SUMMARY OF THE INVENTION

Accordingly it is an object of the invention to provide a practical laser having a spherical resonator which produces spherical modes of oscillation.

It is another object of the invention to provide such a laser which uses a solid state laser gain material and which is laser diode pumped.

It is also an object of the invention to provide several different ways to define the spherical resonator.

It is a further object of the invention to provide a single frequency and single longitudinal mode output beam.

It is another object of the invention to provide effective means for output coupling from the spherical resonator.

The invention comprises method and apparatus for producing a laser having a spherical gain medium and a nonstandard resonator configuration defined entirely within the gain medium which produces laser radiation having spherical rather than planar or cylindrical nature. Two different radiation patterns can be produced depending on the resonator shape. In one embodiment where the entire sphere forms the resonator, laser radiation is produced in all directions, while in an alternative embodiment where the resonator is formed within a toroidal shaped region within the sphere laser radiation is produced in a plane around the entire sphere.

DETAILED DESCRIPTION OF THE PREFERRED EMBODIMENTS

Figure 1:
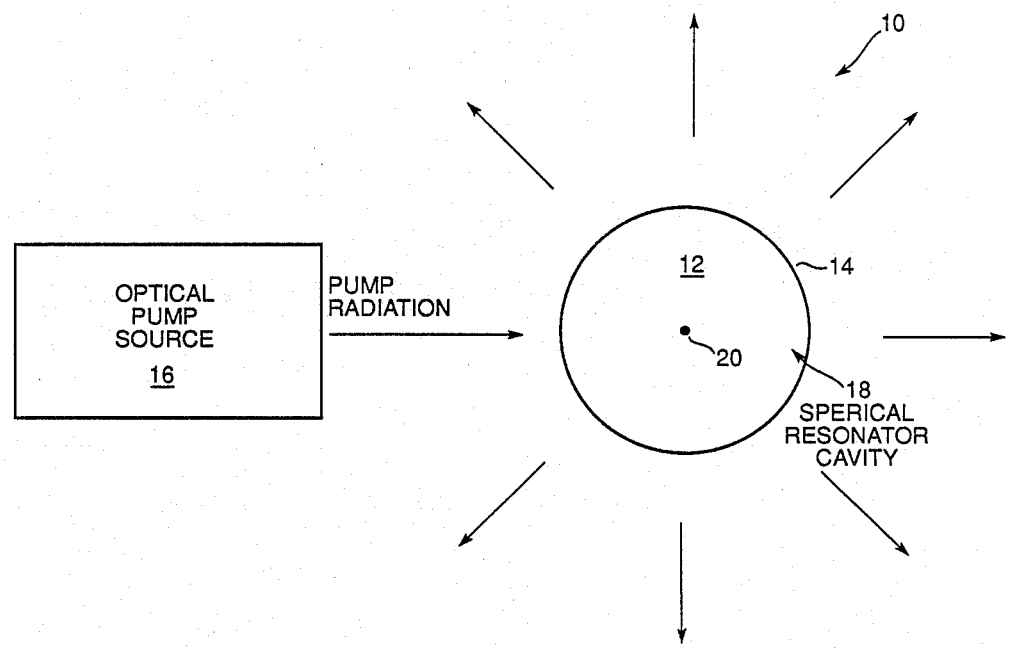
FIG. 1 is a sectional view of the spherical resonator embodiment of the invention.

As shown in FIG. 1, the spherical resonator embodiment 10 of the invention has a sphere 12 of gain medium. The sphere 12 has an isotropic coating 14 which is highly transmissive to pumping radiation from a pump source 16 which is incident at a normal angle to the sphere 12. The coating 14 is highly reflective to the laser radiation produced by the gain medium and defines a resonant cavity 18 within the sphere which allows standing waves to be created within the cavity which are amplified by the excited gain medium filling the cavity. The entire sphere 12 forms the resonant cavity 18. The low transmissivity of the coating 14 provides the output coupling means for the laser cavity 10 which allows a portion of the laser radiation to radiate out uniformly in all directions from the sphere, appearing to come from a point source 20 at the center of the sphere.

Figure 2A:
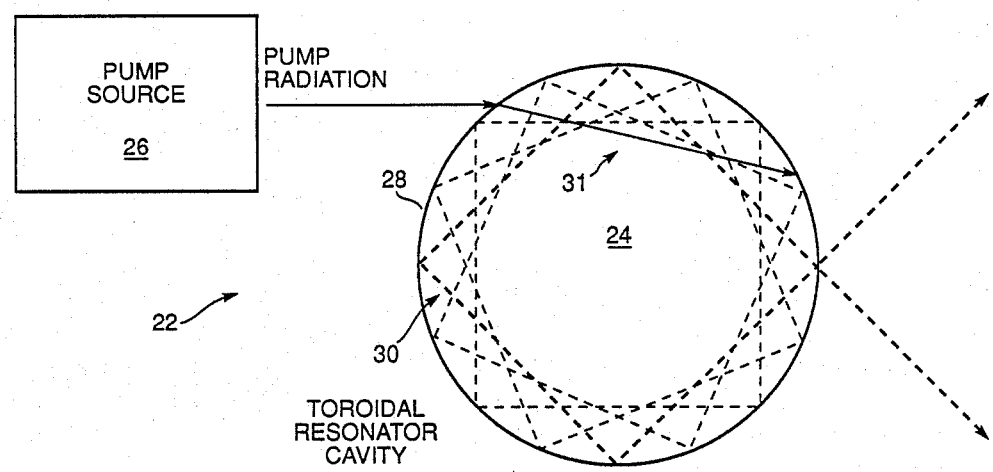
FIGS. 2A and 2B show the toroidal resonator embodiment of the invention, in section, in the plane of the toroid and normal to the plane, respectively.
Figure 2B:
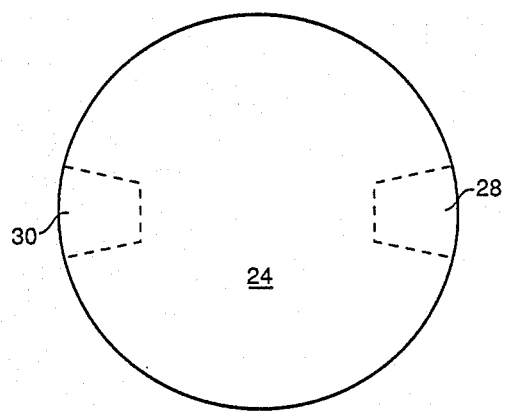

As shown in FIGS. 2A and 2B, the toroidal resonator embodiment 22 of the invention has a sphere 24 of gain medium. Pumping radiation from a pumping source 26 is incident obliquely onto the surface of the sphere 24. In one embodiment the highly polished surface 28 of the sphere is used to form a toroidal shaped resonant cavity 30 within the sphere by total internal reflection. The pumping radiation is incident at an oblique angle such that pumping radiation refracted into the sphere will excite a region of the gain medium which will support spherical modes of oscillation in the toroidal region 30 of the sphere, thereby forming a spherical resonator. The pumping radiation is mainly absorbed in a portion of the toroidal region 30 of the sphere which forms the pumping volume 31 of the resonator; any pumping radiation which is not absorbed is not totally internally reflected and is refracted out at the surface of the sphere. The standing waves created in the resonator 30 are totally internally reflected at the surface of the sphere. The critical angle for total internal reflection is determined by the index of refraction of the gain medium and the surrounding medium (air). The resulting resonator geometry, the region occupied by the standing waves created in the sphere, is a toroidal region abutting an equator of the sphere; the orientation of the equator is determined by the pumping beam and the normal to the sphere at the point of incidence. The toroidal resonator has a cross-section which is approximately wedge-shaped as defined by the complex field pattern of the standing waves around the resonator. Diffraction effects produce the output coupling. The radiation pattern from the sphere is a full circle around the sphere in the equatorial plane of the resonator (with a slight divergence). The output is tangential to the sphere, and appears as two spots on the edges of the sphere.

Figure 3A:
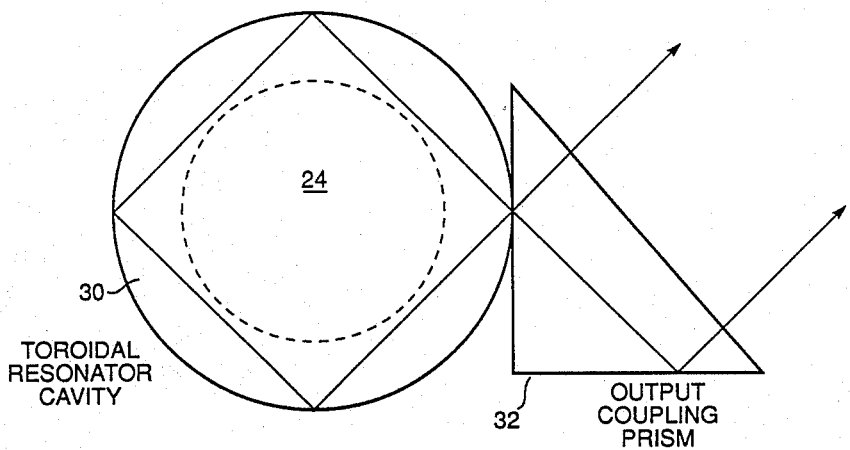
FIGS. 3A, 3B, and 3C illustrate various output coupling schemes for the toroidal resonator.
Figure 3B:
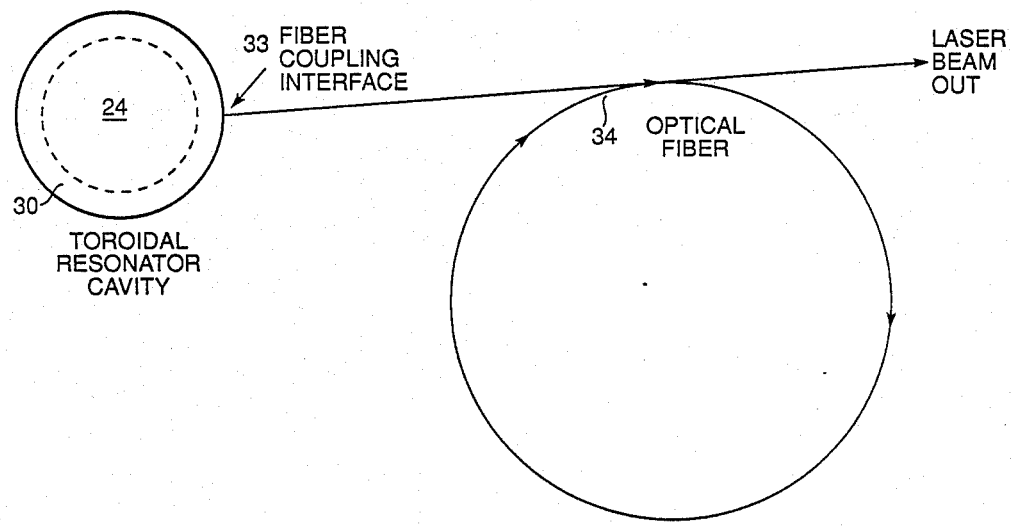

In order to couple out directional beams from the toroidal resonator, an output coupling prism 32, as shown in FIG. 3A, may be placed against the sphere 24. The prism 32 frustrates total internal reflection at the point of contact. Since the spherical oscillations of the toroidal resonator 30 are counter rotating waves, two beams are obtained, spaced apart by the prism geometry. In an alternate embodiment, as shown in FIG. 3B, an optical fiber 34 can be brought into contact with sphere 24, using an index matching fluid at the fiber coupling interface 33, to frustrate total internal reflection so that only a single beam is produced, which can be transmitted through the fiber. The fiber must be oriented so that the reflected beam emitted by the sphere is emitted within the acceptance angle of the fiber.

Figure 3C:
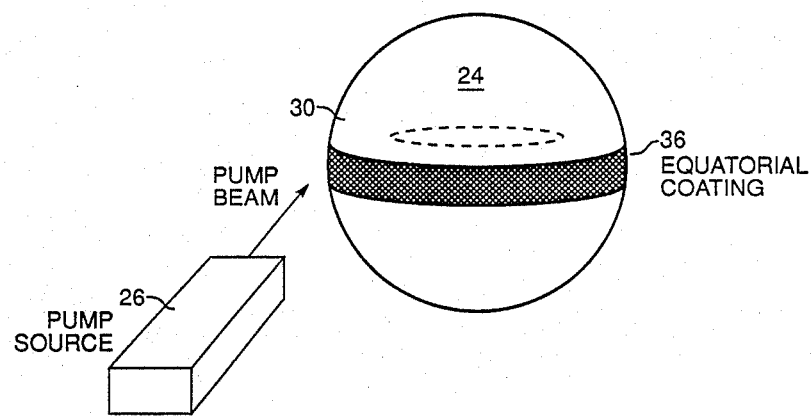
Figure 4:
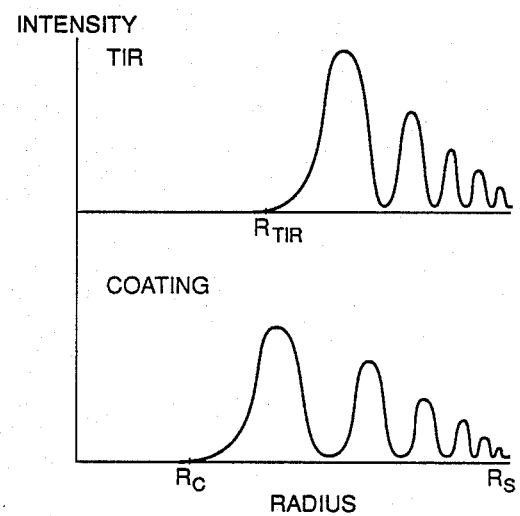
FIG. 4 compares the intensity distributions for the total internal reflection and equatorial coating embodiments of the toroidal resonator.

In order to provide better output coupling than is available in the total internal reflection embodiment, another embodiment using equatorial coating 36, as shown in FIG. 3C, may be utilized. The equatorial coating 36 is placed on an equatorial circle of the sphere 24 as determined by the pumping beam and normal at the point of incidence; however, the pumping beam no longer has to be incident at an angle which produces total internal reflection of the laser radiation. The coating 36 is selected to be highly reflective to the laser radiation and highly transmissive to the pumping radiation; thus a toroidal resonator is produced as before, although the toroid occupies a larger volume than the toroidal resonator produced by total internal reflection and the pumping volume can be better matched to the active mode volume. As shown in FIG. 4, the intensity distributions for the total internal reflection (TIR) and equatorial coating embodiments vary, with the intensity distribution being shifted radially inward for the equatorial coating embodiment ($R_c$ is less than $R_{tir}$ for sphere of radius $R_s$). The coated embodiment also has the advantage that the degree of output coupling can be better controlled. The radial distribution of intensity as shown defines a wedge-shaped region (shown in FIG. 2B) which is rotated around the perpendicular axis to define the toroidal geometry of the resonator. The field also has an intensity distribution circumferentially around the toroid. The output coupling is determined by the transmissivity of the coating to the laser radiation. Thus a transmissivity of 1% or 0.1% or any other value can be utilized in constructing the resonator.

Figure 5:
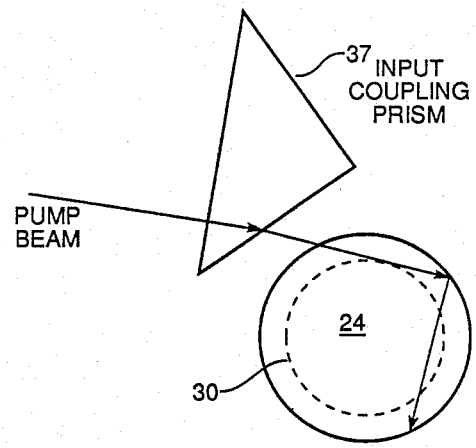
FIG. 5 illustrates an input coupling scheme for the toroidal resonator.

It is also possible to utilize various input coupling schemes to pump the spherical resonators. As shown in FIG. 5, an input coupling prism 37 is placed against the sphere 24 so that pumping radiation may more easily be input to the sphere to pump the toroidal resonator 30. In this case the pumping beam can be input so that it will be totally internally reflected at the surface of the sphere like the laser radiation and a better match of the pumping volume to the active mode volume is possible. By rotating the input coupling prism the angle of the pump beam can be changed so that the pumping volume in the sphere can be controlled and better matched to the mode volume.

The laser configurations according to the invention are relatively easy and inexpensive to construct since the resonator is internal to and entirely contained within the sphere of gain medium. Any solid state laser material that can be formed into a sphere can be used, including but not limited to ruby, sapphire, Nd:YLF, GSGG, Cr:Al$_2$O$_3$, although Nd:YAG is particularly preferred because of its hardness and known laser characteristics. The lasers of the invention will lase at the standard wavelengths for the particular material; for example the Nd:YAG laser will produce laser radiation at 1.064 microns. A variety of pumping sources can be used including diode lasers, ion lasers, and dye lasers, although laser diodes are particularly preferred in a compact inexpensive design; in addition other sources such as incandescent lamps or arc lamps could be used. A high degree of surface finish is required on the spheres, preferably of the order of one-fifth to one-tenth of a wavelength. Spheres with this surface finish are commercially available from Precomp Co., Great Neck, N.Y. The size of the spheres may range from about 1mm–1cm for a practical compact laser design, although other sizes could be used. The coatings are typically made of any material which is highly transmissive to the pumping radiation and highly reflective to the laser radiation. The coating can be performed by any known coating process, e.g. electron beam chemical vapor deposition (CVD). Coating materials include but are not limited to quartz, $SiO_2$, $MgF_2$, $TiO_2$, $Al_2O_3$, $BeO$, $Y_2O_3$, $MgO$, $B_2O_3$, $Sc_2O_3$, $LiF$, $NdF_3$, $ThF_4$, $Na_3AlF_6$, and the like.

A further characteristic of the lasers according to the invention is that the resonators can be designed so that the output radiation is single frequency and single longitudinal mode. By controlling the pumping volume in the toroidal resonator only a limited region of the sphere is active mode volume and this will support oscillations with a single longitudinal mode and single frequency. Thus by physically restricting the pumping region and mode volume in the resonator, output radiation with desired characteristics can be produced. The invention includes these techniques for pumping the spherical mode resonator to produce single longitudinal mode, single frequency output; by means of a selected pumping volume, as chosen by selecting the angle of the pumping radiation, a desired active mode volume can be excited which allows only the desired spherical mode to oscillate in the resonator. Thus a temporally and spatially coherent laser source is provided.

Figure 6A:
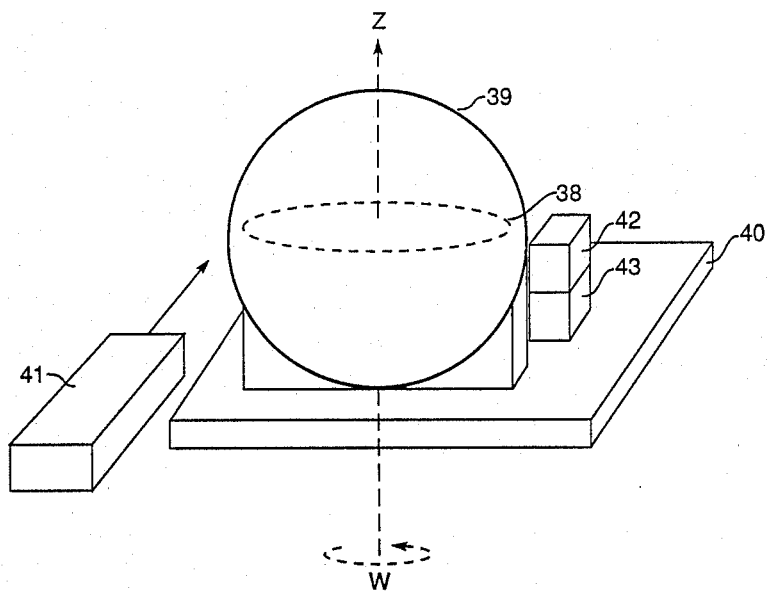
FIGS. 6A and 6B show ring laser gyroscope configurations utilizing the toroidal resonator.
Figure 6B:
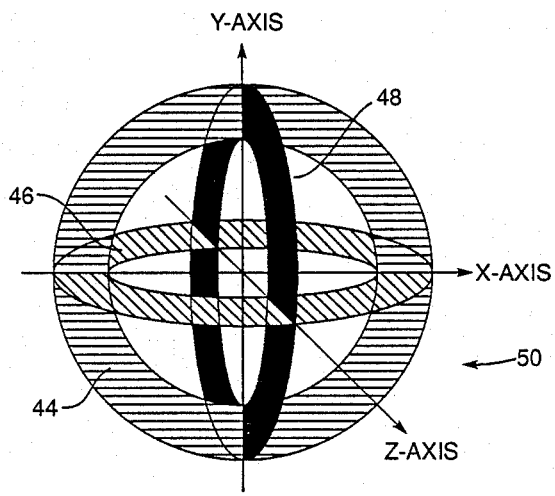

The outputs from these nonstandard resonator configurations provide for a variety of applications. The spherical embodiment appears as a point source so it could be used for tracking. The spherical embodiment could also be used as an ideal source for holography because it is a coherent source radiating in all directions, eliminating the need for any other components besides the object and recording medium. The toroidal embodiment produces a circular output pattern which lies in a plane, and thus could be used for levelling. Another application of the toroidal resonator is as a ring laser gyroscope since the toroidal resonator forms an ideal ring laser. The counter rotating waves of a ring laser are affected differently by rotation of the ring, providing a mechanism for sensing rotation; this principle has been employed to produce the ring laser gyroscope. However, ring laser gyroscopes are conventionally made of polygons where a laser beam traverses a closed path around the polygon to approximate a ring. The present invention provides an ideal ring laser, a laser configured in a perfect ring geometry formed by the toroidal resonator, which can be utilized in a ring laser gyroscope, as shown in FIG. 6A. A laser as previously described, i.e. a sphere 39 containing a toroidal resonator 38, is mounted on an inertial platform (or other moving object) 40 with the normal to the plane of the toroidal resonator aligned with the axis of rotation (Z). An associated pumping source 41 pumps the resonator as previously and a detector 42 (with any associated signal processing means 43) is operatively connected to the resonator to detect the laser radiation from the resonator; a conventional silicon or germanium detector can be used. When the platform 40 is rotated, the variation of the signal from detector 42 is a measure of the rotation. If three orthogonal resonators 44, 46, 48 are defined in sphere 50, as shown in FIG. 6B, each with its own pumping source (not shown) and each with a detector (not shown), a full three-degree of freedom gyroscope is produced.

Changes and modifications in the specifically described embodiments can be carried out without departing from the scope of the invention which is intended to be limited only by the scope of the appended claims.

I claim:
1. A laser apparatus comprising:
    a laser gain medium formed in the shape of a solid sphere;
    pumping means operatively associated with the gain medium for exciting a pumping volume in the sphere;
    a resonant cavity formed within and entirely enclosed within the sphere wherein laser radiation having spherical modes of oscillation is produced when the gain medium in the pumping volume is excited by the pumping means;
    output coupling means for removing a portion of the laser radiation.

2. The apparatus of claim 1 wherein the sphere is made of Nd:YAG.

3. The apparatus of claim 1 wherein the pumping means is a laser diode.

4. The apparatus of claim 1 wherein the pumping means is oriented so that pumping radiation is incident obliquely onto the sphere and the resonant cavity is a toroidal shaped region which is formed by total internal reflection of laser radiation at the surface of the sphere.

5. The apparatus of claim 4 further including an input coupling prism contacting the sphere through which pumping radiation is input into the sphere so that the pumping radiation is totally internally reflected in the sphere.

6. The apparatus of claim 1 further including an equatorial coating on the sphere which is highly transmissive to pumping radiation and highly reflective to laser radiation and wherein the pumping radiation is incident obliquely onto the sphere and the resonant cavity is a toroidal shaped region which is formed by reflection of the laser radiation by the equatorial coating.

7. The apparatus of claim 1 further including an isotropic coating on the entire surface of the sphere which is highly transmissive to pumping radiation and highly reflective to laser radiation wherein the pumping means is oriented so that the pumping radiation is incident normal to the sphere and the resonant cavity occupies the entire sphere.

8. The apparatus of claim 5 wherein the input coupling prism is rotatable to select the pumping volume within the sphere.

9. The apparatus of claim 1 wherein the resonant cavity is a toroidal shaped region contacting the surface of the sphere which produces laser radiation which radiates in a circle in the plane of the toroidal region.

10. The apparatus of claim 9 wherein the pumping volume is matched to an active mode volume in the resonant cavity which produces laser radiation which is single longitudinal mode and single frequency.

11. The apparatus of claim 4 wherein the output coupling means is an output coupling prism placed adjacent to a point on the surface of the sphere to frustrate total internal reflection at that point.

12. The apparatus of claim 4 wherein the output coupling means is an optical fiber contacting a point on the surface of the sphere and oriented so that the laser radiation from the sphere is emitted within the acceptance angle of the fiber.

13. The apparatus of claim 9 further including a detector operatively connected to the toroidal resonant cavity to detect changes in the laser radiation produced by rotation of the sphere.

14. A three degree of freedom laser gyroscope, comprising:
    a laser gain medium formed in the shape of a solid sphere;

pumping means operatively associated with the gain medium;

three orthogonal toroidal resonant cavities formed within and entirely enclosed within the sphere when the gain medium in each cavity is pumped by the pumping means;

detector means operatively connected to each of the three toroidal resonator cavities to detect variations in the laser radiation produced in each cavity by rotation of the sphere.

15. A method of producing laser radiation, comprising:

forming a laser gain medium into a solid sphere;

forming a laser resonant cavity within the sphere of gain material which produces laser radiation having spherical modes of oscillation;

pumping a pumping volume in the gain medium in the cavity to produce an active mode volume in the resonant cavity;

removing laser radiation from the cavity.

16. The method of claim 15 wherein the resonant cavity is formed by totally internally reflecting laser radiation from the surface of the sphere to create a toroidal shaped resonant cavity contacting the surface of the sphere along an equatorial circle where total internal reflection occurs.

17. The method of claim 15 wherein the resonant cavity is formed by forming an equatorial coating on the surface of the sphere which is highly reflective to laser radiation and highly transmissive to pumping radiation to create a toroidal shaped resonant cavity within the sphere.

18. The method of claim 15 wherein the resonant cavity is formed by forming an isotropic coating on the entire surface of the sphere which is highly reflective to laser radiation and highly transmissive to pumping radiation.

19. The method of claim 15 wherein the sphere is formed of Nd:YAG and pumped by a laser diode.

* * * * *